United States Patent
Bennati et al.

(10) Patent No.: US 12,401,994 B2
(45) Date of Patent: Aug. 26, 2025

(54) METHOD, APPARATUS, AND COMPUTER PROGRAM PRODUCT FOR ANONYMIZING TRAJECTORIES

(71) Applicant: HERE GLOBAL B.V., Eindhoven (NL)

(72) Inventors: Stefano Bennati, Zurich (CH); Johannes Braese, Berlin (DE); Elena Vidyakina, Berlin (DE); Elena Mumford, Eindhoven (NL)

(73) Assignee: HERE GLOBAL B.V., Eindhoven (NL)

( * ) Notice: Subject to any disclaimer, the term of this patent is extended or adjusted under 35 U.S.C. 154(b) by 247 days.

(21) Appl. No.: 18/175,067

(22) Filed: Feb. 27, 2023

(65) Prior Publication Data

US 2024/0292209 A1    Aug. 29, 2024

(51) Int. Cl.
  *H04W 12/02*   (2009.01)
  *G06F 16/29*   (2019.01)
  *H04W 4/02*    (2018.01)

(52) U.S. Cl.
  CPC ............ *H04W 12/02* (2013.01); *G06F 16/29* (2019.01); *H04W 4/025* (2013.01); *G06F 2221/2111* (2013.01)

(58) Field of Classification Search
  None
  See application file for complete search history.

(56) References Cited

U.S. PATENT DOCUMENTS

| | | | |
|---|---|---|---|
| 9,097,542 B2* | 8/2015 | Morlock | G01C 21/3841 |
| 10,918,001 B2* | 2/2021 | Furukawa | H05K 13/0409 |
| 11,979,792 B2* | 5/2024 | Matsumoto | G01C 21/3815 |
| 2012/0023057 A1* | 1/2012 | Winberry | G09B 29/00 |
| | | | 706/50 |

(Continued)

FOREIGN PATENT DOCUMENTS

| | | |
|---|---|---|
| CN | 112700637 A | 4/2021 |
| CN | 112818402 B | 5/2021 |
| EP | 4099725 A1 | 12/2022 |

OTHER PUBLICATIONS

Extended European Search Report for European Application No. 24159562.8 dated Jul. 4, 2024, 11 pages.

(Continued)

*Primary Examiner* — Lashonda Jacobs-Burton
(74) *Attorney, Agent, or Firm* — ALSTON & BIRD LLP (57) ABSTRACT

A method, apparatus, and computer program product are provided for anonymizing a trajectory. Methods may include: receiving a sequence of probe data points defining a portion of a trajectory, each probe data point defining a location, where an origin includes a starting point of the trajectory and a destination includes an ending point of the trajectory; initiating a timer; in response to the timer reaching a predetermined time and the portion of the trajectory not including the origin or the destination, publishing the sequence of probe data points; and in response to the timer reaching a predetermined time and the portion of the trajectory including the destination and not the origin, generating a generalized destination of the trajectory as a current geographic grid cell of the trajectory and publishing the generalized destination.

20 Claims, 6 Drawing Sheets

(56) References Cited

U.S. PATENT DOCUMENTS

| | | | | |
|---|---|---|---|---|
| 2012/0259547 | A1* | 10/2012 | Morlock | G01C 21/3819 |
| | | | | 701/400 |
| 2015/0300835 | A1* | 10/2015 | Fowe | G08G 1/012 |
| | | | | 701/410 |
| 2018/0066957 | A1* | 3/2018 | Stroila | G01C 21/3841 |
| 2018/0121483 | A1* | 5/2018 | Giurgiu | G06F 16/23 |
| 2018/0188053 | A1 | 7/2018 | Fukuda et al. | |
| 2020/0018607 | A1 | 1/2020 | Balu | |
| 2020/0107163 | A1* | 4/2020 | Li | G06F 18/24137 |
| 2020/0112832 | A1 | 4/2020 | Li et al. | |
| 2021/0172759 | A1 | 6/2021 | Li et al. | |
| 2021/0383022 | A1 | 12/2021 | Bennati et al. | |
| 2022/0136841 | A1* | 5/2022 | Bennati | H04W 4/02 |
| | | | | 701/411 |
| 2022/0394425 | A1* | 12/2022 | Vidyakina | H04W 4/026 |
| 2023/0204382 | A1* | 6/2023 | Nutakki | G01C 21/3841 |
| | | | | 701/409 |

OTHER PUBLICATIONS

Bennati et al., "Modelling imperfect knowledge via location semantics for realistic privacy risks estimation in trajectory data", Scientific Reports 12, Article No. 246, (Jan. 7, 2022), 10 pages.

U.S. Appl. No. 18/175,037, filed Feb. 27, 2023, entitled "Method, Apparatus, And Computer Program Product For Anonymizing Trajectories", 40 pages.

\* cited by examiner

METHOD, APPARATUS, AND COMPUTER PROGRAM PRODUCT FOR ANONYMIZING TRAJECTORIES

TECHNOLOGICAL FIELD

An example embodiment of the present disclosure relates to anonymizing trajectories of mobile devices, and more particularly, to anonymizing trajectories in a manner that reduces privacy risks while providing high utility for all use cases.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to anonymizing trajectories in a manner that reduces privacy risks while providing high utility for all use cases. According to an example embodiment, an apparatus is provided including at least one processor and at least one memory including computer program code, the at least one memory and computer program code configured to, with the processor, cause the apparatus to at least: receive a sequence of probe data points defining a portion of a trajectory, each probe data point defining a location, where an origin includes a starting point of the trajectory and a destination includes an ending point of the trajectory; initiate a timer; in response to the timer reaching a predetermined time and the portion of the trajectory not including the origin or the destination, publish the sequence of probe data points; in response to the timer reaching a predetermined time and the portion of the trajectory including the destination and not the origin, generate a generalized destination of the trajectory as a current geographic grid cell of the trajectory and publish the generalized destination; and in response to the timer reaching the predetermined time and the portion of the trajectory including the origin and not the destination, generate a generalized origin of the trajectory as a geographic grid cell containing the origin and publish the generalized origin of the trajectory.

According to some embodiments, in response to the timer reaching the predetermined time and the portion of the trajectory including both the origin and the destination of the trajectory, failing to publish the sequence of probe data points. The starting point of the trajectory includes, in some embodiments, a first probe data point having a dwell time greater than a first predetermined time before a next probe data point having a different location than the first probe data point. The ending point of the trajectory includes, in some embodiments, a second probe data point having a dwell time greater than a second predetermined time after reaching a location of the second probe data point.

According to some embodiments, in response to the sequence of probe data points defining the portion of the trajectory crossing from a first geographic cell into a second geographic cell, publish the portion of the trajectory. According to some embodiments, causing the apparatus to publish the sequence of probe data points includes causing the apparatus to publish the sequence of probe data points to a location-based service provider. According to certain embodiments, causing the apparatus to publish the sequence of probe data points includes causing the apparatus to publish the sequence of probe data points in near real-time, delayed no more than the predetermined time from receipt of the sequence of probe data points.

Embodiments provided herein include a computer program product having at least one non-transitory computer-readable storage medium having computer-executable program code portions stored therein, the computer-executable program code portions including program code instructions to: receive a sequence of probe data points defining a portion of a trajectory, each probe data point defining a location, where an origin includes a starting point of the trajectory and a destination includes an ending point of the trajectory; initiate a timer; in response to the timer reaching a predetermined time and the portion of the trajectory not including the origin or the destination, publish the sequence of probe data points; in response to the timer reaching a predetermined time and the portion of the trajectory including the destination and not the origin, generate a generalized destination of the trajectory as a current geographic grid cell of the trajectory and publish the generalized destination; and in response to the timer reaching the predetermined time and the portion of the trajectory including the origin and not the destination, generate a generalized origin of the trajectory as a geographic grid cell containing the origin and publish the generalized origin of the trajectory. Embodiments described herein further include a computer program product having computer-executable program code portions stored therein, the computer executable program code portions including program code instructions configured to perform any method described herein.

According to some embodiments, in response to the timer reaching the predetermined time and the portion of the trajectory including both the origin and the destination of the trajectory, failing to publish the sequence of probe data points. The starting point of the trajectory includes, in some embodiments, a first probe data point having a dwell time greater than a first predetermined time before a next probe data point having a different location than the first probe data point. The ending point of the trajectory includes, in some embodiments, a second probe data point having a dwell time greater than a second predetermined time after reaching a location of the second probe data point.

According to some embodiments, in response to the sequence of probe data points defining the portion of the trajectory crossing from a first geographic cell into a second geographic cell, publish the portion of the trajectory. According to some embodiments, the program code instructions to publish the sequence of probe data points include program code instructions to publish the sequence of probe data points to a location-based service provider. According to certain embodiments, the program code instructions to publish the sequence of probe data points include program code instructions to publish the sequence of probe data points in near real-time, delayed no more than the predetermined time from receipt of the sequence of probe data points.

Embodiments provided herein include methods including: receiving a sequence of probe data points defining a portion of a trajectory, each probe data point defining a location, where an origin includes a starting point of the trajectory and a destination includes an ending point of the trajectory; initiating a timer; in response to the timer reaching a predetermined time and the portion of the trajectory not including the origin or the destination, publishing the sequence of probe data points; in response to the timer reaching a predetermined time and the portion of the trajectory including the destination and not the origin, generating a generalized destination of the trajectory as a current geographic grid cell of the trajectory and publishing the generalized destination; and in response to the timer reaching the predetermined time and the portion of the trajectory including the origin and not the destination, generating a generalized origin of the trajectory as a geographic grid cell containing the origin and publishing the generalized origin of the trajectory.

According to some embodiments, in response to the timer reaching the predetermined time and the portion of the trajectory including both the origin and the destination of the trajectory, failing to publish the sequence of probe data points. The starting point of the trajectory includes, in some embodiments, a first probe data point having a dwell time greater than a first predetermined time before a next probe data point having a different location than the first probe data point. The ending point of the trajectory includes, in some embodiments, a second probe data point having a dwell time greater than a second predetermined time after reaching a location of the second probe data point.

According to some embodiments, in response to the sequence of probe data points defining the portion of the trajectory crossing from a first geographic cell into a second geographic cell, publishing the portion of the trajectory. According to some embodiments, publishing the sequence of probe data points includes publishing the sequence of probe data points to a location-based service provider. According to certain embodiments, publishing the sequence of probe data points includes publishing the sequence of probe data points in near real-time, delayed no more than the predetermined time from receipt of the sequence of probe data points.

Embodiments provided herein include an apparatus including: means for receiving a sequence of probe data points defining a portion of a trajectory, each probe data point defining a location, where an origin includes a starting point of the trajectory and a destination includes an ending point of the trajectory; means for initiating a timer; in response to the timer reaching a predetermined time and the portion of the trajectory not including the origin or the destination, means for publishing the sequence of probe data points; in response to the timer reaching a predetermined time and the portion of the trajectory including the destination and not the origin, means for generating a generalized destination of the trajectory as a current geographic grid cell of the trajectory and means for publishing the generalized destination; and in response to the timer reaching the pre-determined time and the portion of the trajectory including the origin and not the destination, means for generating a generalized origin of the trajectory as a geographic grid cell containing the origin and means for publishing the generalized origin of the trajectory.

According to some embodiments, in response to the timer reaching the predetermined time and the portion of the trajectory including both the origin and the destination of the trajectory, means for failing to publish the sequence of probe data points. The starting point of the trajectory includes, in some embodiments, a first probe data point having a dwell time greater than a first predetermined time before a next probe data point having a different location than the first probe data point. The ending point of the trajectory includes, in some embodiments, a second probe data point having a dwell time greater than a second predetermined time after reaching a location of the second probe data point.

According to some embodiments, in response to the sequence of probe data points defining the portion of the trajectory crossing from a first geographic cell into a second geographic cell, the apparatus includes means for publishing the portion of the trajectory. According to some embodiments, the means for publishing the sequence of probe data points includes means for publishing the sequence of probe data points to a location-based service provider. According to certain embodiments, the means for publishing the sequence of probe data points includes means for publishing the sequence of probe data points in near real-time, delayed no more than the predetermined time from receipt of the sequence of probe data points.

BRIEF DESCRIPTION OF THE DRAWINGS

Having thus described example embodiments of the disclosure in general terms, reference will now be made to the accompanying drawings, which are not necessarily drawn to scale, and wherein:

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

A method, apparatus, and computer program product are provided herein in accordance with an example embodiment for anonymizing trajectories of mobile devices, and more particularly, to anonymizing trajectories in a manner that reduces privacy risks while providing high utility for all use cases. Location-based services are useful to a variety of consumers who may employ location-based services for a wide range of activities. Services such as the identification of traffic density along road segments, providing information regarding goods and services available in a specific location, identifying commuting patterns, and identifying a target group of consumers in a particular location or who travel along a particular path, are among many other location-based services. While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult.

Embodiments of the algorithm described herein employ an anonymization strategy that is suitable to release anonymized data that has a high utility for both traffic estimation use cases and commuting pattern analysis. The algorithm described herein releases a middle portion of a trajectory as accurately as possible, such that the data can be used to generate accurate estimations of traffic congestion as well as releasing the origin and destination of the trajectory as coarse spatiotemporal locations which enable accurate analysis of commuting patterns.

The privacy risks of disclosing trajectory data using the algorithms described herein are reduced by computing the coarse spatiotemporal locations of the origin and destination in such a way that is not revealing of the actual origin and destination, even when combined with information about the central (published) portion of the trajectory. This is done by buffering the probe data and making a decision about publishing a trajectory point as a generalized location (for origin and destination) or as precise probe data (for the middle part of the trajectory) only after a certain analysis, described below, has been performed. In this manner, near real-time publishing of the data can be achieved.

Real-time and near real-time publishing of data is important for certain types of location-based services. For example, traffic density information is most accurate when informed by real-time or near real-time trajectory data. Real-time and near real-time, as described herein, includes data that is provided without substantial delay. This generally includes data that is provided in less than a predetermined time from which the data is generated. The predetermined time may vary depending upon the type of data, as some data has greater latency; however, generally the predetermined time is a minute or less of delay from which the data is generated. The delay may include or be entirely due to processing delays and constraints as location-based data can be voluminous depending upon the data provided (e.g., rich sensor data, images, etc.), such that processing delays can be considered real-time or substantially real-time.

The algorithm of example embodiments described herein can be applied at the client (e.g. vehicle, mobile device, etc.) or at a backend (e.g., map services provider, OEM, etc.) as there are no dependencies of the anonymization of one user's trajectory on that of any other user. In the client-side situation, the resolution of the spatial grid, the size of the timeout of T_max, and the time window size, all described below, need to be communicated to each client. The grid resolution may be sufficient in terms of a regular grid approach for tessellating the geographic area; however, with irregular grids (e.g., using geographical boundaries, borders, bodies of water, postal codes, etc.) the grid definition may be necessary at each client. Then each client can independently apply the algorithm and publish its own anonymized data. This facilitates the real-time and near real-time publication of trajectory data.

While various anonymization strategies exist, they generally are typically tailored to a specific use case, for which they grant a certain level of utility while reducing privacy risks. Naively applying an anonymization strategy to a different use case can lead to increased privacy risks as well as reduced data utility for that user case. Location-based services (LBS), e.g. real-time traffic information, fleet management, navigation, are based on the analysis of trajectory data that users of such services provide. Location data can be used for multiple application use cases, e.g. traffic estimation, analysis of commuting patterns, etc. Exchanged location data must be anonymized to comply with regulation, but anonymization strategies are tailored to a specific use case and can reduce the utility of the data for use in another use case.

Applying multiple different anonymization strategies to the same, non-anonymized data can lead to high utility in multiple use cases, but can also lead to unexpected privacy risks that can arise from the combination of these datasets. By combining two datasets that have been produced from the same original dataset using two different anonymization strategies may lead to inference of more information about the original dataset than can be inferred from each individually anonymized dataset. For example, if one anonymization strategy anonymizes 20% of a dataset using a first technique, while a second anonymization strategy for a different use case anonymizes a different 20% of the dataset using the second technique, combining these two anonymized datasets may reveal 90% or more of the original dataset. Embodiments provided herein provide a tailored anonymization strategy that keeps privacy risks low while providing high utility for multiple use cases.

Figure 1:
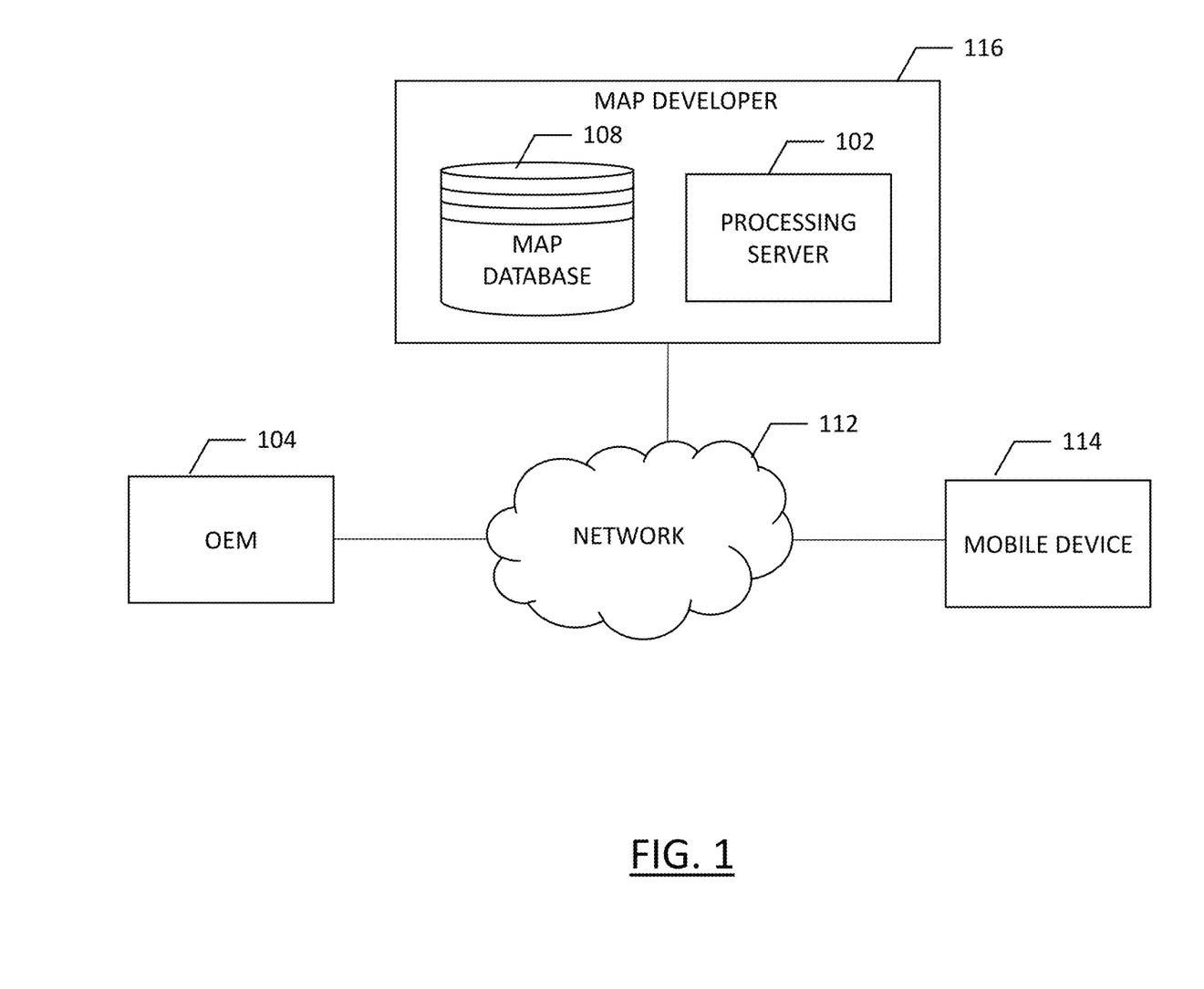
FIG. 1 illustrates a communications diagram in accordance with an example embodiment of the present disclosure.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map developer 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. Further, data may be compiled relating to the existence of parking and parking space availability along different road segments of the map database, where a parking availability estimation may be generated in dependence of time of day, day of week, season of the year, special events, etc. Park-in and park-out events, may be established based on the assessment of whether a vehicle is performing a parking maneuver followed by a stop in movement of the probe (park-in) or a vehicle is performing a parking maneuver followed by continued movement of the probe (park-out), and the relative movement of vehicles performing park-in to performing park-out maneuvers can be used to estimate parking availability. Further, this data can be compiled for temporal clustering of epochs to estimate future parking availability. The navigation-related functions can correspond to vehicle navigation, pedestrian navigation, or other types of navigation.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. The map database 108 may optionally include grid definitions for applying the disclosed anonymization process. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. The downloaded map database can be updated periodically, on-demand, based on user/application requests (e.g., for a specific area determined to be outdated), such as via the communication network 112. The map database can further be updated with the grid definitions to establish the tessellations of the geographic area.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

Figure 2:
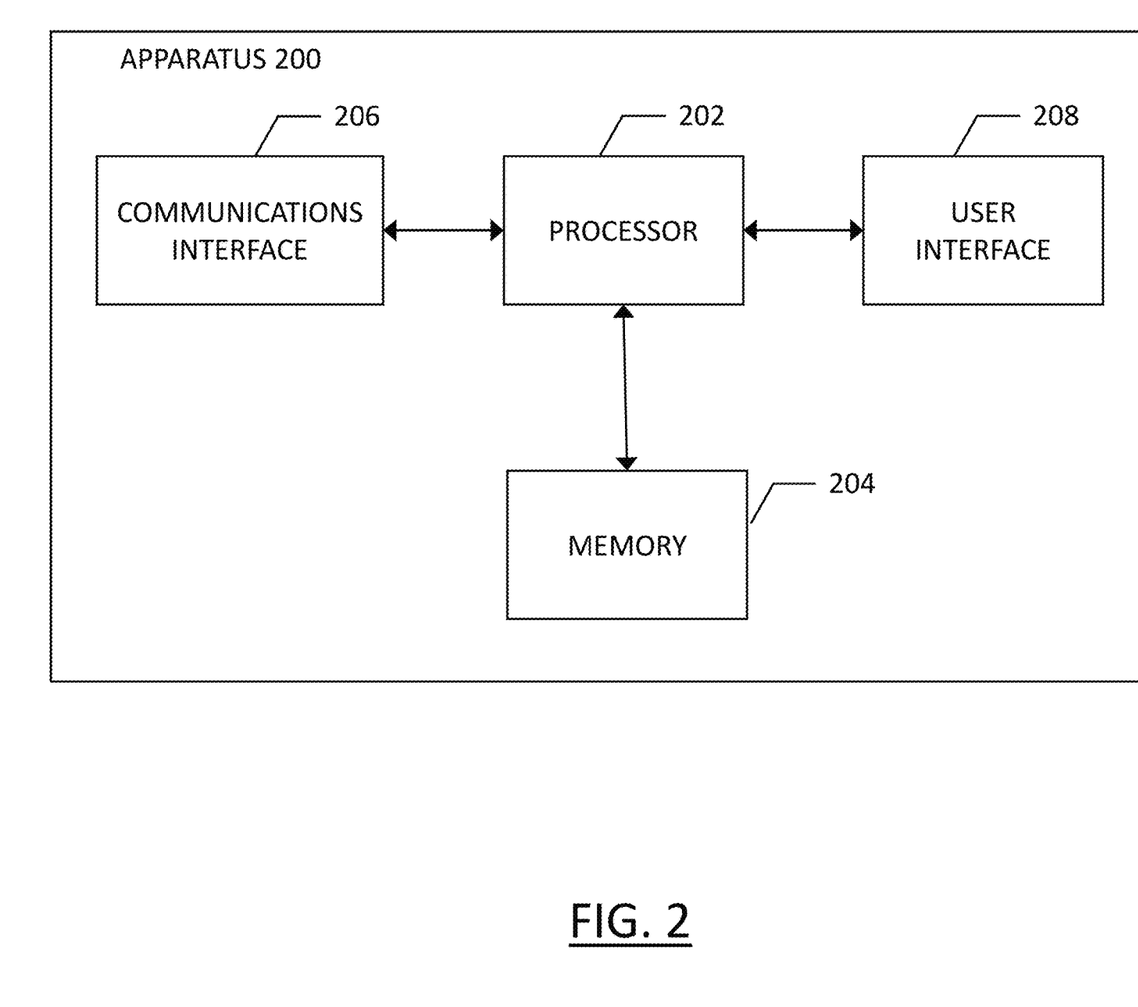
FIG. 2 is a block diagram of an apparatus that may be specifically configured for anonymizing trajectories generated from probe data in accordance with an example embodiment of the present disclosure.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to anonymizing trajectories in a manner that reduces privacy risks while providing high utility for all use cases. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of trajectory data that users of such services provide. Trajectory data is associated with a privacy level and accuracy value. An accuracy value is based on the intrinsic utility of data toward the generation of location-based services. The privacy value reflects the sensitive information that trajectory data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, privacy-enhancing algorithms can be performed on trajectory data either by the location-based service provider, or by the entity gathering the trajectory data (e.g., an OEM). Privacy-enhancing algorithms function by removing or altering features of the data that may remove privacy, and this operation typically renders the data less accurate and thus less valuable for the location-based service provider.

Different location-based services have differing data needs for the service to be accurate and useful. For example, useful trajectory data that has a relatively high accuracy value for traffic estimation includes a spatiotemporal component of the data that is as precise as possible in order to map the trajectory data onto the correct road segment and correctly infer the state of traffic based on the behavior of the trajectory. Useful trajectory data that has a relatively high accuracy value for commuting pattern analysis includes a spatial component of the origin and destination, obscured to some degree. The origin and destination locations can be rounded to a relatively large area.

Currently, there are no anonymization strategies that provide high utility for both the use cases of traffic congestion estimation and analysis of commuting patterns. This leads either to increased privacy risks for the data subjects which produce the trajectory data, or low utility and accuracy values for the location-based service providers. Embodiments described herein provide an anonymization strategy that is suitable to release anonymized trajectory data that has high utility for both the traffic estimation and the commuting pattern analysis use cases.

Embodiments described herein release the middle portion of a trajectory as accurately as possible, such that the trajectory data can be used to generate accurate estimations of traffic congestion as well as releasing the origin and destination of the trajectory as coarse spatiotemporal locations which enable accurate analysis of commuting patterns. The privacy risks are reduced by computing the coarse spatiotemporal locations of the origin and destination in a manner that is not revealing of the actual origin and destination, even when combined to the information about the portion of the trajectory between the coarse origin and destination.

Embodiments described herein provide privacy to users of location-based services by adding uncertainty regarding the origin and destination of trajectory data of the user. An origin and destination, separately or as a pair, can reveal sensitive locations regarding the user that generated the trajectory data, such as a home location and/or a work location, and identification of an origin, a destination, or both, may render the identity of the individual user relatively easy to obtain. Trajectory data as described herein is defined as a set of data points, each data point including a location and a timestamp. The location may be in the form of latitude and longitude, and potentially altitude. Additional information may be associated with a data point, such as a timestamp (or approximate time stamp), speed, heading, etc.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein mitigate this issue by cropping the trajectories through removal of the initial and final sections of the trajectory in order to introduce uncertainty about the actual origin and destination of the trajectory. If a trajectory includes additional sensitive points (e.g., stopping for a period of time at a location such as a hospital), the same approach can be applied to sub-trajectories to crop portions of a trajectory around a potentially sensitive location or stay point within a trajectory. To maximize the utility of the data thereby improving the location-based services provided by the service provider, embodiments described herein identify a suitable location where to crop the trajectory based on an analysis of the trajectory.

Stay points, as described herein, are locations where the probe data point does not change locations or "dwells" for a predetermined amount of time. A stay point can also be considered an origin for a trajectory that begins at the stay point, or a destination for a trajectory that ends at the stay point. While a trajectory can include a plurality of stay points, the trajectory can optionally be considered a sequence of several trajectories, each with an origin and destination corresponding to the starting point and ending point of the trajectory (or sub-trajectory thereof), respectively. For example, an origin can be determined based on a first probe data point having a dwell time greater than a first predetermined time before a next probe data point having a different location than the first probe data point is received. This predetermined time may be variable depending upon a context of the probe data, such that a dwell time may be shorter in an environment with many points-of-interest as the stay point may be a gas station or quick shopping trip. Similarly, an ending point or destination of a trajectory can be established based on a second probe data point having a dwell time greater than a second predetermined time after reaching a location of the second probe data point.

While the cropping of trajectories can be performed using a constant temporal threshold (e.g., delete data until 2 minutes after start) or using a speed threshold (e.g., delete data until after the vehicle reaches a speed of 30 miles-per-hour), such embodiments can perform poorly in many circumstances. For example, a vehicle leaving a parking lot into a congested road, as a slow-moving vehicle would not get far from the parking lot within the temporal threshold. Leaving a parking lot into a high speed road would reach a speed threshold very quickly enabling identification of the origin of the trajectory. Leaving a farm in a rural area, where population density is much lower than in a city and therefore uncertainty about the origin of the trajectory would be much lower than desired (e.g., if the road segment where the trajectory starts leads to only a handful of residential units). Embodiments described herein solve these issues through a unique method of cropping trajectories. Embodiments described herein introduce uncertainty in what is the origin and destination of a trajectory while avoiding unnecessary degradation of the data.

As noted above, different use cases have differing trajectory data needs to be effective. Traffic density estimation benefits from a spatiotemporal component that is as accurate as possible in order to identify where traffic his heavy along road segments inferred from behavior of the trajectory data with respect to time. Commuting pattern analysis benefits from the spatial component of the origin and destination, which can be rounded to a relatively large area, such as the size of a zip code or neighborhood, while the temporal area can be rounded to an arbitrary time window (e.g., one hour). The connection between the origin and destination should remain accurate for commuting pattern analysis.

Stay points, as defined herein, are spatiotemporal locations where a vehicle stops for a relatively long period of time, which corresponds to an activity, such as an activity outside of the vehicle. Stay points can include reaching the destination, refueling, shopping, meeting/appointments, etc. All of these activities may reveal personal information about the vehicle occupant(s). Stay points can optionally be identified based on a context. For example, stopping for two minutes at a location corresponding to a bank may be inferred as a stay point (e.g., revealing where a user banks or collects money from an Automated Teller Machine), while stopping for two minutes at a busy traffic signal interchange may not be inferred as a stay point.

The algorithm of example embodiments described herein employs a spatial grid to facilitate generalization of the actual origin location and actual destination location of a trajectory. A determination on a level of generalization of probe data to be published is made based on this spatial grid. The grid can be introduced in a number of ways. A regular grid can be introduced based on a dataset density and acceptable privacy risk. For example, one kilometer square grid units. An irregular grid can be introduced based on a variety of features. For example, an irregular grid can be based on topology of the geographical area, postal code, map features (e.g., bodies of water, bridges, road network topology, geographical boundaries/borders, etc.), population density, point-of-interest (POI) density, or the like. The irregular grid can be formed based on an acceptable privacy risk, where cells with higher density can be smaller than those with lower density, where the density can be POI density, population density, building density, etc. The grid may be generated based on some commonly employed tessellations, such as geohash, map tiles, quadtree map tiles H3 hexagonal tiles, etc. The grid definitions described herein may be synchronized with a client device, such as mobile device 114 for a locally-stored tessellated map database. This grid definition may be included as an updatable map layer.

According to some embodiments, a user may be able to mark certain areas (e.g., grid cells, postal codes, etc.) as privacy sensitive such that location information within those areas are always obscured (e.g., dropped without publication). Areas that include such features as a child's school, a user's home or work location, or the like. A user May optionally select certain areas to not be privacy sensitive if location-based service accuracy and performance is prioritized.

Figure 3:
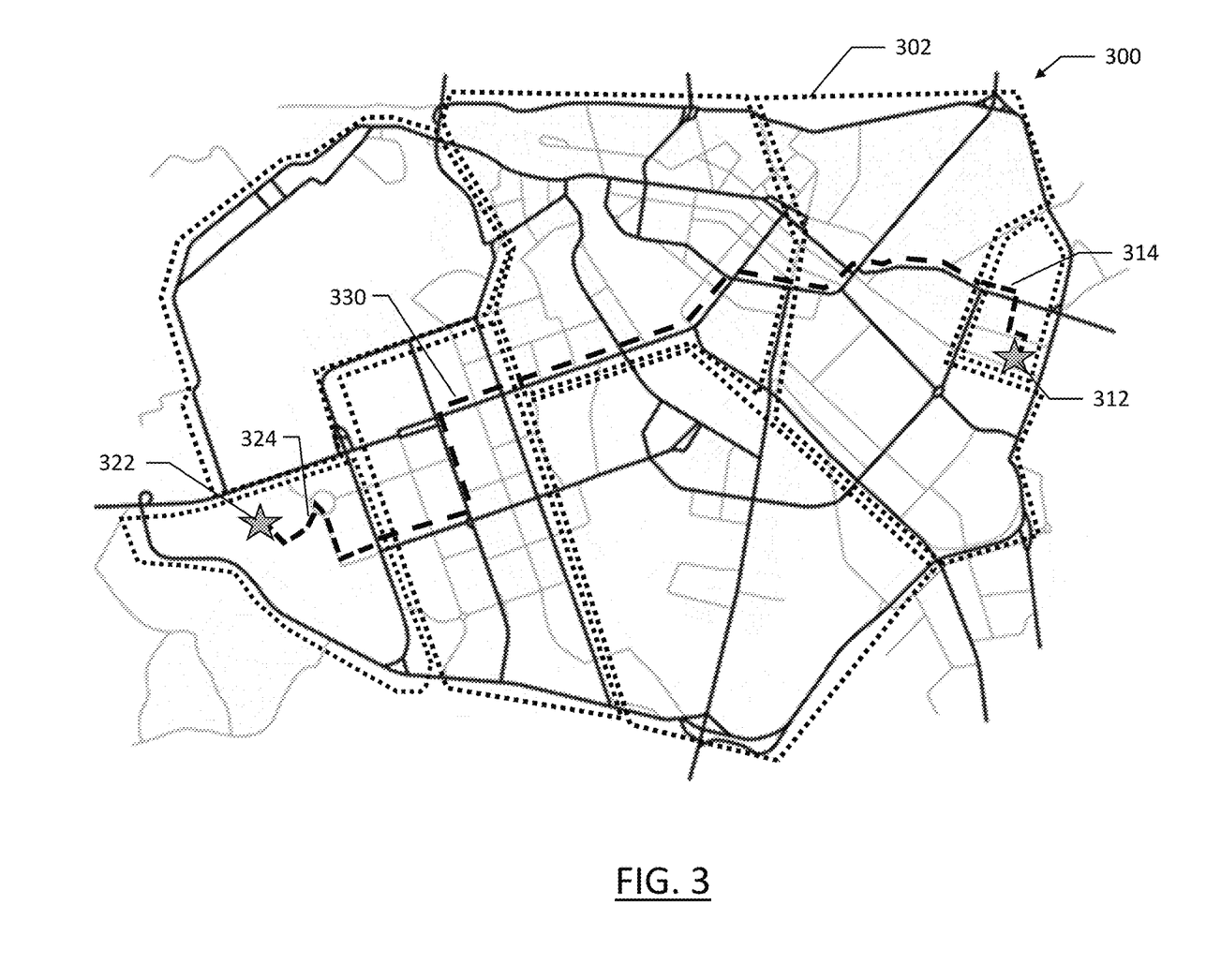
FIG. 3 illustrates a mapped area including an origin grid cell area, a destination grid cell area, and a trajectory according to an example embodiment of the present disclosure.

FIG. 3 illustrates an example embodiment of a mapped area 300 including an irregular spatial grid defined by dotted-line grid boundaries such as boundary 302. The irregular grid of FIG. 3 can be formed based on any of the parameters identified above, and while grid cell boundaries are shown adjacent to one another for illustrative purposes, grid boundaries are shared such that crossing a boundary transitions from one grid cell to another.

In addition to a spatial grid that is introduced, a timeout time or "T_max" can be introduced. For a privacy maximizing version, as a trajectory is formed, the timeout timer initiates each time a trajectory crosses a grid cell border, and after no data is received for T_max time. Trajectory information including a portion of the trajectory within a given grid cell is published when the trajectory crosses to a new grid cell. If T_max is reached while a trajectory is within a single grid cell, the probe data from within that single grid-cell is not published. An advantage of this version is that data is not published in the grid cell that contains the destination as T_max would be reached. A disadvantage is that data is published only when the trajectory crosses grid cell borders, such that data publishing may be delayed depending upon the grid cell size. For a utility maximizing version, the timer activates and timeout timer resets at each grid cell border crossing of the trajectory and resets every T_max period of time. The first timer activates on the first border crossing. An advantage of this version is that data is always published within T_max minutes from it being received. However, this version may permit publishing of probe data in the grid cell containing the destination.

Figure 4:
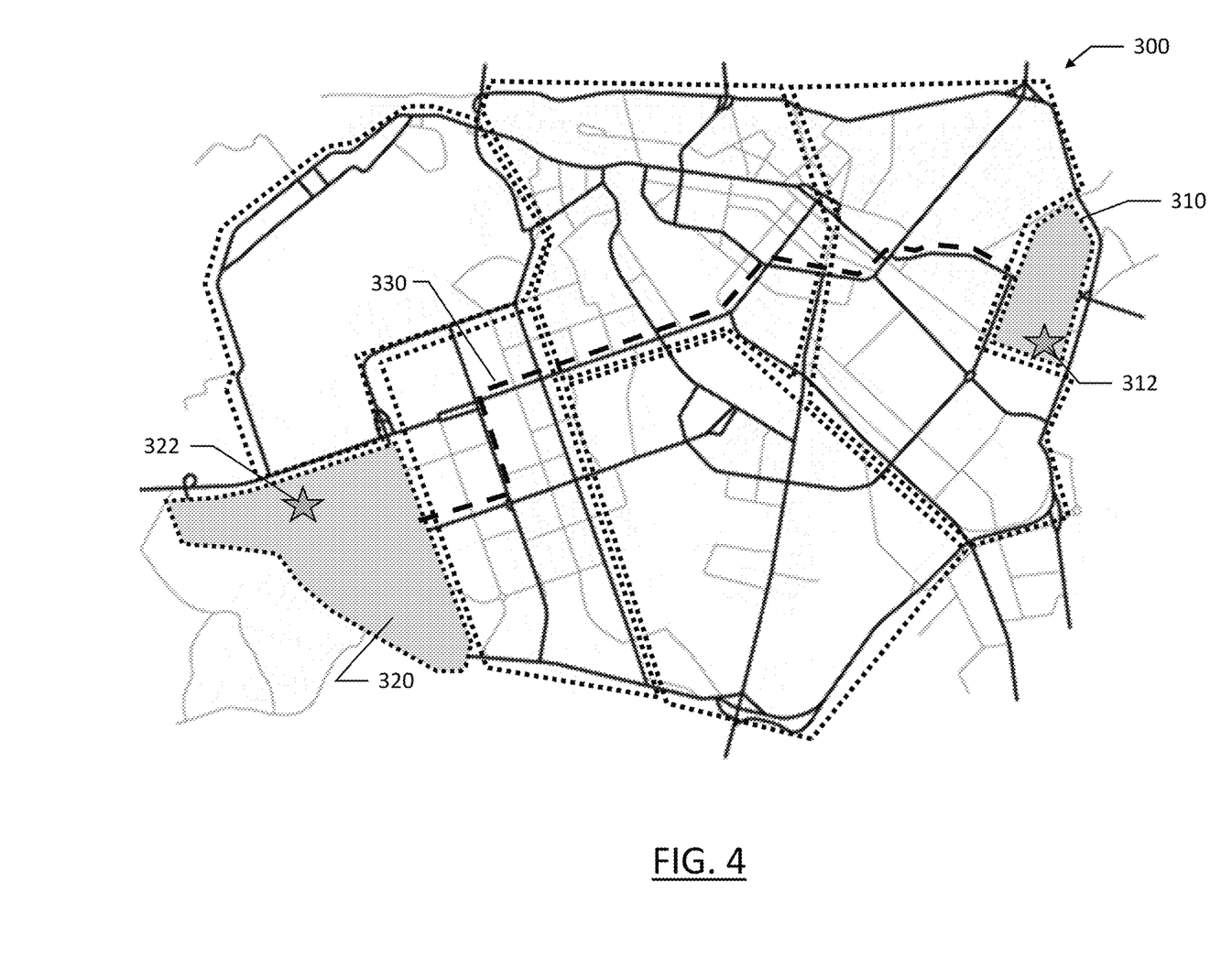
FIG. 4 illustrates the mapped area of FIG. 3 with the origin portion and the destination portion of the trajectory omitted according to an example embodiment of the present disclosure.

Referring again to FIG. 3, a trajectory 330 may be formed of probe data points between an origin 312 and a destination 322. In the privacy-sensitive embodiment described above, probe data of the trajectory is provided when a grid cell border is crossed. As such, the origin portion 314 of the trajectory 330 and the destination portion 324 of the trajectory are not published. The origin portion 314 of the trajectory occurs before a grid cell boundary is crossed, while the destination portion 324 of the trajectory occurs after the last grid cell boundary is crossed. FIG. 4 illustrates origin grid cell 310 and destination grid cell 320 that include portions of the trajectory 330 that are not published, such that only the portion of the trajectory between the origin grid cell 310 and the destination grid cell 320 are published.

In addition to obfuscating the origin and destination using the origin area and destination area described above, the origin and destination timestamps are generalized to further anonymize the trajectory. The algorithm described herein further introduces an algorithm to obtain a generalized version of the timestamp associated with the trajectory data. The timestamp of example embodiments is generalized not based on the actual origin location and actual destination location, but instead based on the first probe data point of the trajectory that is to be published, and the last probe data point of the trajectory that is to be published.

Figure 5:
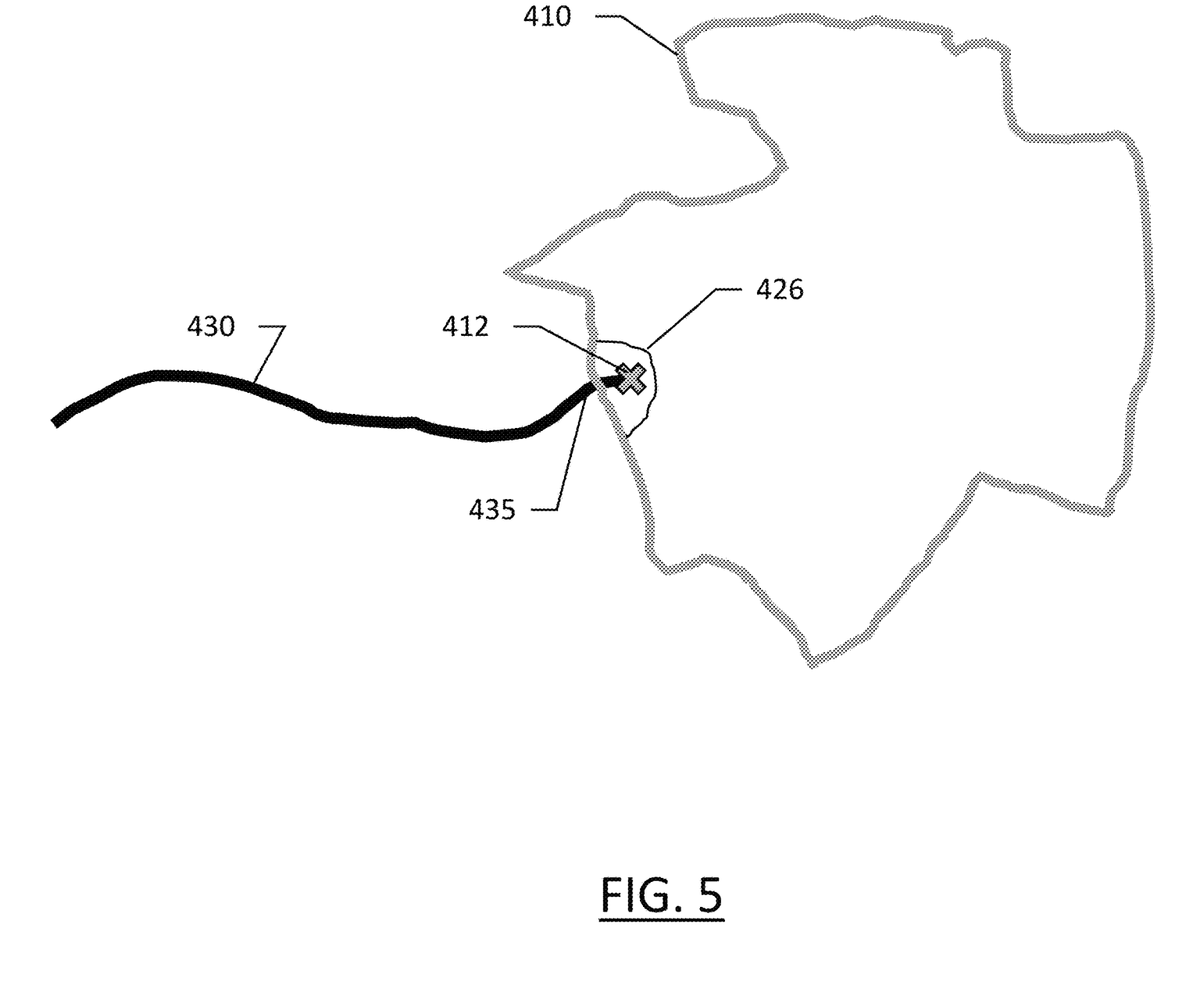
FIG. 5 illustrates an origin area with an origin inside an inferred area based on timestamping of trajectory data according to an example embodiment of the present disclosure.

The actual origin and destination timestamps should be generalized to a certain level, though if this is performed based on a fixed grid (e.g., 9:00.00-9:59.99, 10:00.00-10:59.99, etc.), there can arise situations in which the information revealed by the points in the trajectory can disclose information about the origin and destination. FIG. 5 illustrates such an example embodiment where an origin location 412 is found within an origin area 410 defined by a zip code, for example. If the actual origin departure time is, for example, 10:01 am, and the first timestamp of the first shared/published point 435 of the trajectory 430 occurs at 10:02 am, since timestamps are generalized to within hour blocks, the origin can be presumed to be within two minutes travel time of the exit point from the origin area, or within inferred area 426.

Embodiments described herein provide a mechanism to generalize the origin and destination timestamps such that they remain useful and accurate, while also provide privacy. Instead of generalizing the real origin and destination timestamps, embodiments generalize a timestamp of a first probe data point and last probe data point of the trajectory that is to be shared or published. In such an embodiment, the same time grid is introduced for all trajectories and determine into which cell the aforementioned generalized timestamp falls. This solution provides an efficient method of introducing privacy since there is no additional data about the real origin or destination being shared. However, in some cases this approach can compromise utility by returning a generalized time that is not representative of the actual time, such as if there is a long delay between the actual origin and the first published point of the trajectory. To improve upon this, another approach for timestamp generalization is implemented.

To further improve utility of the probe data with generalized timestamps, a time window is defined based on a time of the first point of the trajectory data that falls outside of the origin area and one time window based on the time of the last point outside of the destination area. For example, the first point with a timestamp of 10:10 and the time window size is 30 minutes, a series of time windows ending at 10:01 and a size of 30 minutes are defined: 9:31-10:01, 9:01-9:31, 8:31-9:01, . . . . The same is performed for the last point with a timestamp of 11:24, defining time windows: 11:24-11:54, 11:54-12:24, . . . . In case all points of the trajectory have been dropped, such as is the case with FIG. 5, two random points near the actual origin and destination can be selected to define the temporal components of the origin and destination areas. The defined windows within which the actual origin and destination fall are identified. For example, an origin with a timestamp of 9:12 falls in the time window of 9:01-9:31, while a destination with a timestamp of 11:31 falls in the time window 11:24-11:54.

Embodiments described herein provide trajectory data as it is collected through buffering of the trajectory probe data points and publishing them periodically as described above, based on transitions of the trajectory across grid boundaries or when the timer reaches T_max. The timestamp of the published trajectory data can be generalized as described above to further anonymize the probe data points, while simultaneously providing data that is useful for both traffic density determination and commuting pattern analysis.

Based on the utility focused version described above, the unpublished batch of data that was buffered since the last publication of trajectory data is published when the timeout T_max resets. When the timeout is reset, the data batch can match one of four possibilities. A first possibility includes a trip that start can be detected in the data batch. If the trip started in the unpublished batch of data, where the start can refer to a detected stay point or to the first probe data point being received, a generalized version of the origin is published which corresponds to the description of a grid cell. This case is always triggered by a border crossing such that there is at least one point in a cell other than the cell where the trip start data was detected. For the trip start data batch, the generalized version of the timestamp can be published that is obtained from the algorithm described above.

A second possibility for the data batch is a trip end. If the trip ends in the unpublished batch of data, with the end including either a detected stay point or to data not being received, a generalized version of the destination of the trip can be published, which corresponds to the description of the current grid cell, and all probe data that is contained within the cell is dropped. The timestamps are generalized as described above. The point provided as input to this algorithm is the last point of the last-published data batch. This last point may either be the last point before entering the current grid cell, or a probe data point that is in the current cell in case the previous data batch contains probe data located in the current cell and the last batch of data was published (e.g., using the utility focused version of the algorithm described above). If the detected end point of the trajectory refers to a stay point and probe data is received after the stay point, the timer is deactivated and the trajectory data publishing process is on hold until the timer is reactivated.

A third possibility for the data batch is when both start (origin) and end (destination) are detected in the data batch. In such an embodiment, no data from the trajectory is published as the trajectory is too short. Such a short trajectory not only has significant privacy risks of reidentification, but the probe data from such a short trajectory is not very useful for location-based services.

A fourth possibility for the data batch is if the trip did not start or end in the unpublished batch of data. In such an embodiment, there is no evidence of a start of a trajectory, a stay point, or an end of a trajectory by timeout. In such a case, the probe data for the batch is published as it is not likely to be privacy revealing. Optionally, further anonymization can be performed by using splitting and gapping. The trajectory can be further anonymized to maximize utility for the traffic use case through splitting and gapping in real-time or near real-time. Optionally, splitting and gapping can be applied to this trajectory data, where the trajectory is divided into multiple segments which have different segment identifiers and are separated by gaps. When applying splitting and gapping, the segment identifier of the first and last segments do not need to be changed for the anonymized trajectory, as these points are easily relatable with the origin and destination as their time component is related and the points are located at the edge of the origin area and destination area, respectively. Given that the origin and destination must remain associated to achieve the utility described herein (e.g., having the same identifier for the commuting use case), the anonymization should rotate the IDs of all segments except the first and last segments.

Once the trajectories are anonymized using the process described herein, the anonymization level or privacy level of each trajectory can be measured to implement further mitigations. For example, the k-anonymity level of each trajectory can be measured, and trajectories with an anonymity level below a predefined measure can be dropped and not published to a location-based service provider. The privacy level can be established based, for example, on comparing origin-destination pairs, comparing the middle parts of the trajectories, or both. In each case, k-anonymity is measured by counting how many other trajectories at least partially overlap with the origin, destination, or both of a single trajectory.

Once the data is anonymized, which may require the anonymized trajectory to satisfy a predetermined anonymity measure or score, the data can be published or released. This data can be released to location-based service providers such that they can provide useful and accurate location-based services. The release or publication of the origin, destination, and trajectory can be performed by an update of a trajectory database, for example. The release or publication can include the transmission of the data over an Application Programming Interface (API) to a location-based service provider. The release or publication optionally includes generating a dataset listing (e.g., for a data marketplace) including the trajectory data.

Embodiments described herein provide a mechanism by which data that is valuable to both temporally-sensitive traffic use cases, and to location accuracy-sensitive commuting pattern analysis. Generally, these two use cases have different priorities such that a single anonymization strategy generally does not produce satisfactory results for both use cases. However, embodiments provided herein are tailored to provide both location accuracy and spatiotemporal accuracy, while providing sufficient anonymization for the source of the trajectory. Privacy risks are thereby minimized and mitigated.

Embodiments compute privacy metrics for the data such that this information can be used to apply further mitigations. Embodiments combine anonymization requirements such that utility is maximized where origin and destination are not cut from the released probe data as they are already removed as part of the origin/destination anonymization using the origin area and destination area. Embodiments enable measurement of which start/end cut is sufficient to achieve a sufficient level of k-anonymity such that the loss of utility is always justified as it indeed provides privacy. In contrast to conservative start/end cuts that sometimes result in lost utility without significant improvement in privacy protection. Embodiments provide two alternative ways of optimizing which offer a trade-off between computational cost and utility.

Figure 6:
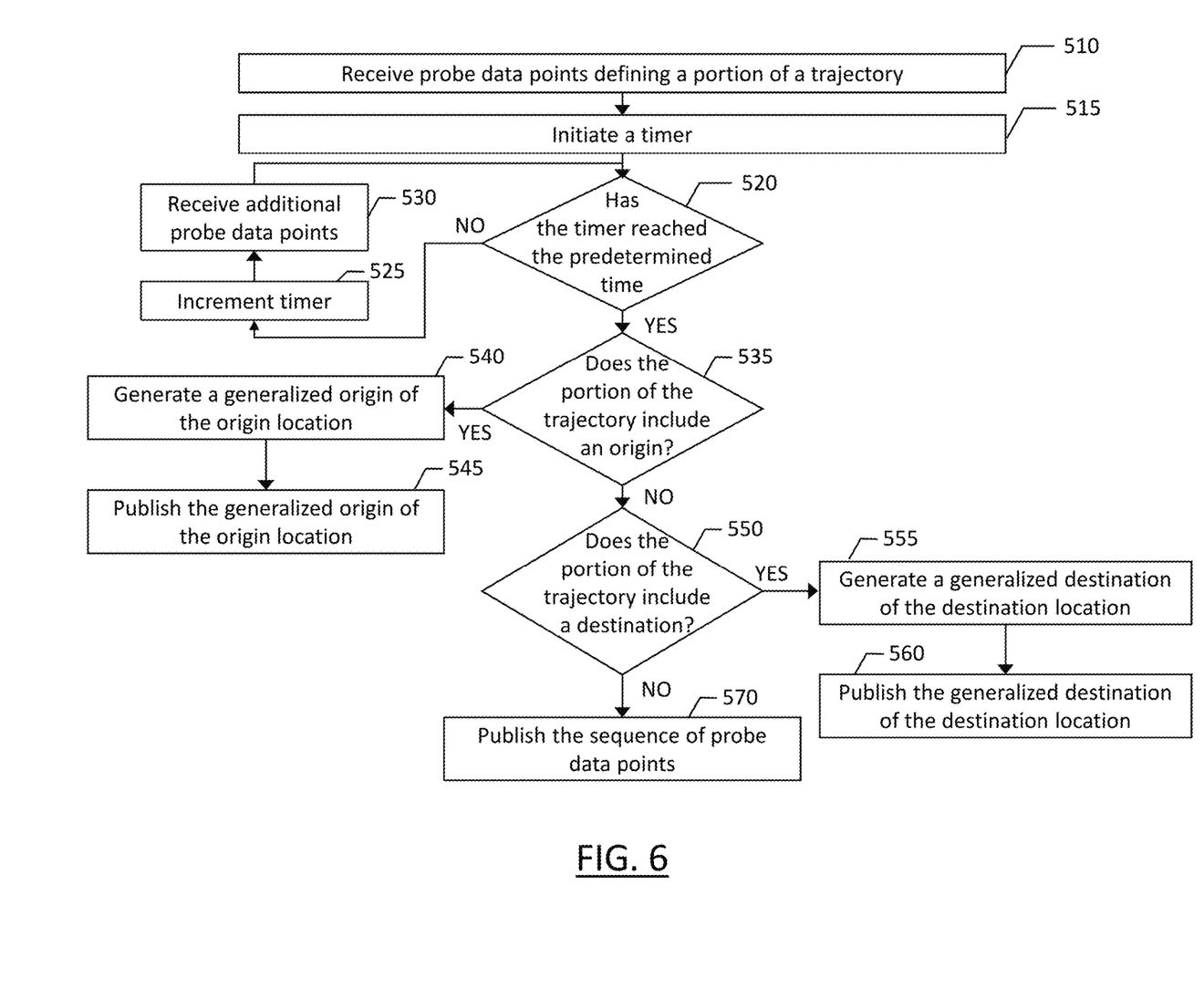
FIG. 6 is a flowchart of a method for anonymizing trajectory data while maintaining utility for multiple use cases according to an example embodiment of the present disclosure.

FIG. 6 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method of anonymizing trajectories of mobile devices, and more particularly, anonymizing trajectories in a manner that reduces privacy risks while providing high utility for all use cases. Probe data points are received at 510 defining a portion of a trajectory. These probe data points can be received from vehicles and/or mobile devices traveling within a geographic area. Each probe data point defines a location. An origin of the trajectory is a starting point of the trajectory, while a destination of the trajectory is an ending point of the trajectory. A timer is initiated at 515 based on probe data received. At 520) a determination is made as to whether the timer has reached a predefined time. If the predefined time has not been reached, the timer continues to increment at 525, and additional probe data points are received at 530. Once the predefined time has been reached by the timer at 520, a determination is next made with regard to the portion of the trajectory captured. At 535 it is determined if the portion of the trajectory includes an origin. If so, a generalized origin of the origin location is generated at 540 based on a geographic grid cell containing the origin, and the generalized origin is published at 545.

If no origin is included in the portion of the trajectory at 535, a determination is made at 550) as to whether the portion of the trajectory includes a destination. If a destination is within the portion of the trajectory, a generalized destination of the destination location is generated based on a current geographic grid cell of the trajectory at 555, and the generalized destination is published at 560. If no destination is included within the portion of the trajectory at 550, the portion of the trajectory has no origin or destination (e.g., privacy sensitive points), and the sequence of probe data points is published at 570.

In an example embodiment, an apparatus for performing the method of FIG. 6 above may include a processor (e.g., the processor 202) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising:
at least one processor and at least one memory including computer program code, the at least one memory and computer program code configured to, with the processor, cause the apparatus to at least:
receive a sequence of probe data points defining a portion of a trajectory, each probe data point defining a location, wherein an origin comprises a starting point of the trajectory and a destination comprises an ending point of the trajectory;
initiate a timer;
in response to the timer reaching a predetermined time and the portion of the trajectory not including the origin or the destination, publish the sequence of probe data points;
in response to the timer reaching the predetermined time and the portion of the trajectory including the destination and not the origin, generate a generalized destination of the trajectory as a current geographic grid cell of the trajectory and publish the generalized destination of the trajectory; and in response to the timer reaching the predetermined time and the portion of the trajectory including the origin and not the destination, generate a generalized origin of the trajectory as a geographic grid cell containing the origin and publish the generalized origin of the trajectory.

2. The apparatus of claim 1, wherein in response to the timer reaching the predetermined time and the portion of the trajectory including both the origin and the destination of the trajectory, failing to publish the sequence of probe data points.

3. The apparatus of claim 1, wherein the starting point of the trajectory comprises a first probe data point having a dwell time greater than a first predefined time before a next probe data point having a different location than the first probe data point.

4. The apparatus of claim 3, wherein the ending point of the trajectory comprises a second probe data point having a dwell time greater than a second predefined time after reaching a location of the second probe data point.

5. The apparatus of claim 1, wherein in response to the sequence of probe data points defining the portion of the trajectory crossing from a first geographic cell into a second geographic cell, publish the portion of the trajectory.

6. The apparatus of claim 1, wherein causing the apparatus to publish the sequence of probe data points comprises causing the apparatus to publish the sequence of probe data points to a location-based service provider.

7. The apparatus of claim 1, wherein causing the apparatus to publish the sequence of probe data points comprises causing the apparatus to publish the sequence of probe data points in near real-time delayed no more than the predetermined time from receipt of the sequence of probe data points.

8. A computer program product comprising at least one non-transitory computer-readable storage medium having computer-executable program code portions stored therein, the computer-executable program code portions comprising program code instructions configured to:

receive a sequence of probe data points defining a portion of a trajectory, each probe data point defining a location, wherein an origin comprises a starting point of the trajectory and a destination comprises an ending point of the trajectory;

initiate a timer;

in response to the timer reaching a predetermined time and the portion of the trajectory not including the origin or the destination, publish the sequence of probe data points;

in response to the timer reaching the predetermined time and the portion of the trajectory including the destination and not the origin, generate a generalized destination of the trajectory as a current geographic grid cell of the trajectory and publish the generalized destination of the trajectory; and in response to the timer reaching the predetermined time and the portion of the trajectory including the origin and not the destination, generate a generalized origin of the trajectory as a geographic grid cell containing the origin and publish the generalized origin of the trajectory.

9. The computer program product of claim 8, wherein in response to the timer reaching the predetermined time and the portion of the trajectory including both the origin and the destination of the trajectory, failing to publish the sequence of probe data points.

10. The computer program product of claim 8, wherein the starting point of the trajectory comprises a first probe data point having a dwell time greater than a first predefined time before a next probe data point having a different location than the first probe data point.

11. The computer program product of claim 10, wherein the ending point of the trajectory comprises a second probe data point having a dwell time greater than a second predefined time after reaching a location of the second probe data point.

12. The computer program product of claim 8, wherein in response to the sequence of probe data points defining the portion of the trajectory crossing from a first geographic cell into a second geographic cell, publish the portion of the trajectory.

13. The computer program product of claim 8, wherein the program code instructions to publish the sequence of probe data points comprise program code instructions to publish the sequence of probe data points to a location-based service provider.

14. The computer program product of claim 8, wherein the program code instructions to publish the sequence of probe data points comprise program code instructions to publish the sequence of probe data points in near real-time delayed no more than the predetermined time from receipt of the sequence of probe data points.

15. A method comprising:

receiving a sequence of probe data points defining a portion of a trajectory, each probe data point defining a location, wherein an origin comprises a starting point of the trajectory and a destination comprises an ending point of the trajectory;

initiating a timer;

in response to the timer reaching a predetermined time and the portion of the trajectory not including the origin or the destination, publishing the sequence of probe data points;

in response to the timer reaching the predetermined time and the portion of the trajectory including the destination and not the origin, generating a generalized destination of the trajectory as a current geographic grid cell of the trajectory and publishing the generalized destination of the trajectory; and in response to the timer reaching the predetermined time and the portion of the trajectory including the origin and not the destination, generating a generalized origin of the trajectory as a geographic grid cell containing the origin and publishing the generalized origin of the trajectory.

16. The method of claim 15, wherein in response to the timer reaching the predetermined time and the portion of the trajectory including both the origin and the destination of the trajectory, failing to publish the sequence of probe data points.

17. The method of claim 15, wherein the starting point of the trajectory comprises a first probe data point having a dwell time greater than a first predefined time before a next probe data point having a different location than the first probe data point.

18. The method of claim 17, wherein the ending point of the trajectory comprises a second probe data point having a dwell time greater than a second predefined time after reaching a location of the second probe data point.

19. The method of claim 15, wherein in response to the sequence of probe data points defining the portion of the trajectory crossing from a first geographic cell into a second geographic cell, publishing the portion of the trajectory.

20. The method of claim 15, wherein publishing the sequence of probe data points comprises publishing the sequence of probe data points to a location-based service provider.

* * * * *